UNITED STATES PATENT OFFICE.

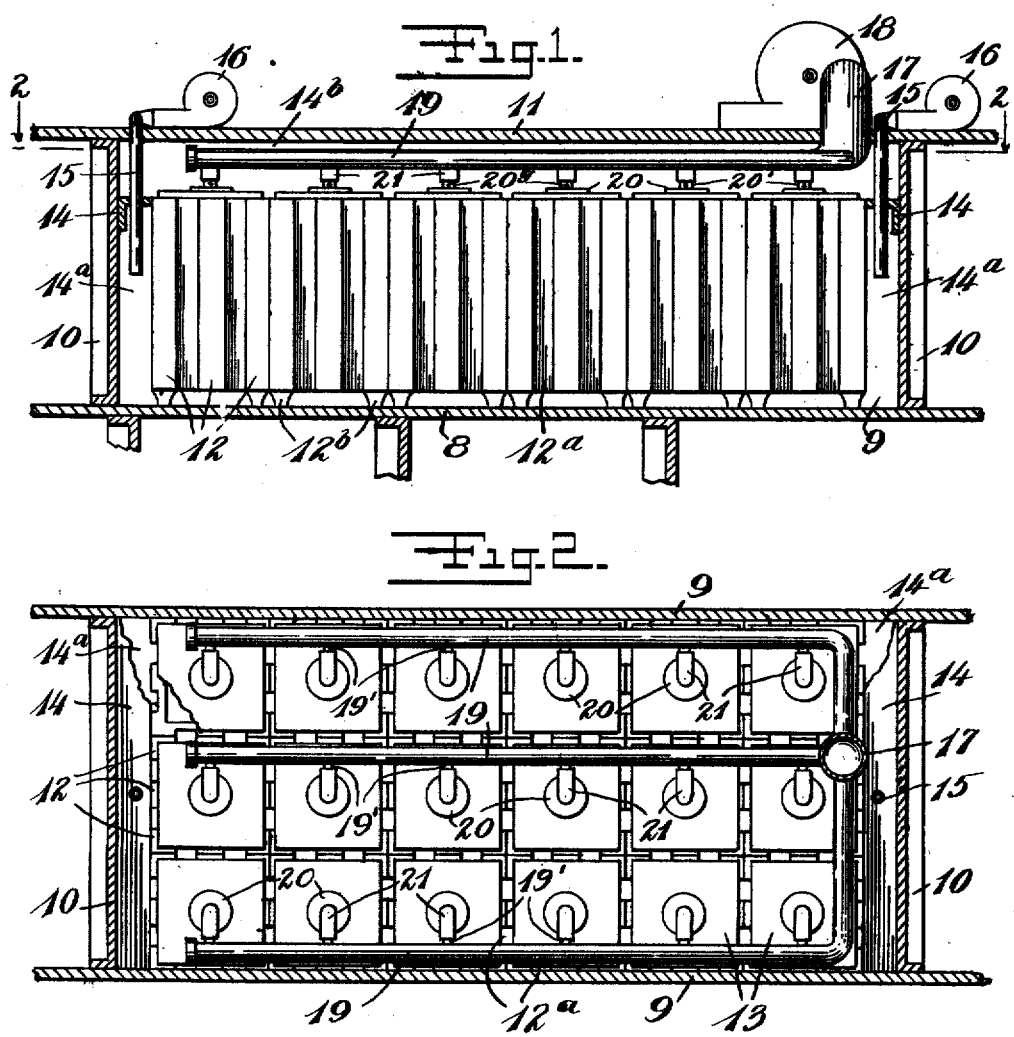

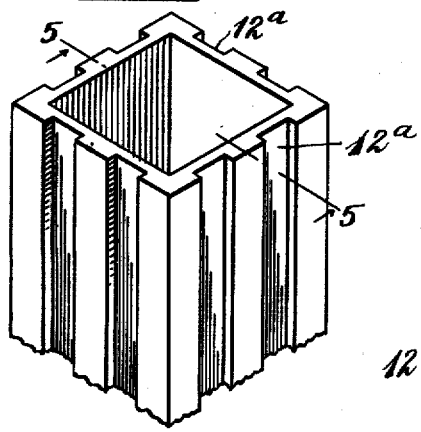
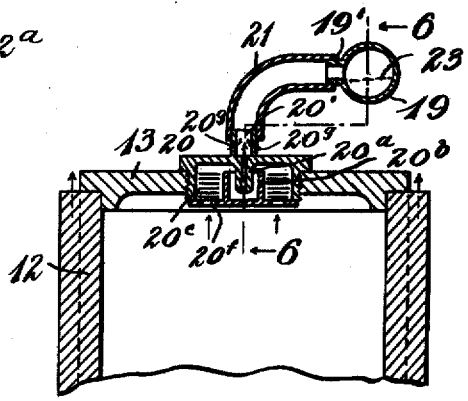
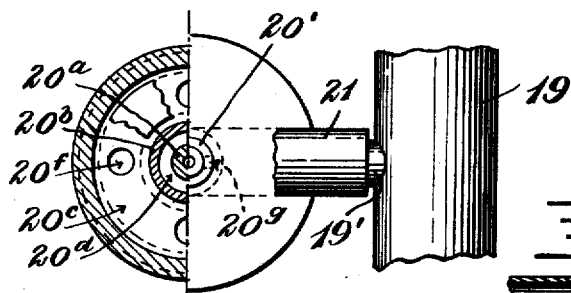
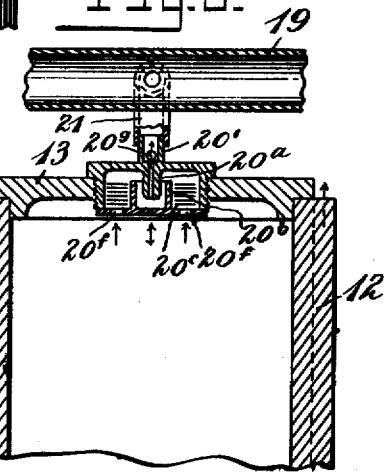
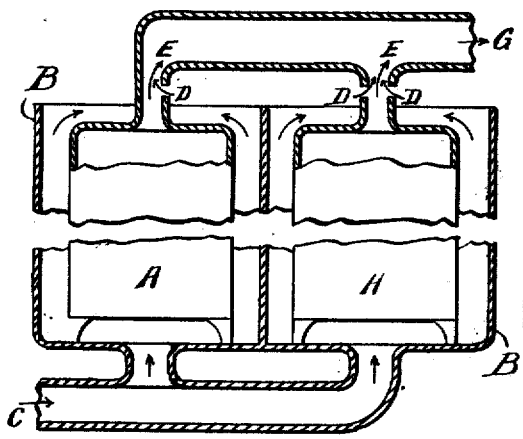

CHARLES H. BEDELL AND GRANT E. EDGAR, OF NEW LONDON, CONNECTICUT, ASSIGNORS TO ELECTRIC BOAT COMPANY, OF NEW YORK, N. Y., A CORPORATION OF NEW JERSEY.

PROCESS OF COOLING, VENTILATING, AND RENDERING INNOCUOUS STORAGE BATTERIES.

1,313,512.     Specification of Letters Patent.     Patented Aug. 19, 1919.

Application filed November 30, 1915. Serial No. 64,380.

*To all whom it may concern:*

Be it known that we, CHARLES H. BEDELL and GRANT E. EDGAR, both citizens of the United States, and residents of New London, in the county of New London and State of Connecticut, respectively, have invented certain new and useful Improvements in Processes of Cooling, Ventilating, and Rendering Innocuous Storage Batteries; and we do hereby declare the following to be a full, clear, and exact description of the invention, such as will enable others skilled in the art to which it appertains to make and use the same.

The underlying process of the present invention, as well as an illustrative system which will presently be disclosed as suitable means for carrying out the process, may be described briefly as a safety means for use in connection with secondary or storage batteries, having the following four advantageous characteristics, to wit, a ventilation of each cell interior, a cooling of each cell and hence of the entire battery, a negligible evaporation of the electrolyte, and such a treatment of the generated gases as to make them non-explosive.

It is well known that the usual practice in connection with power plants of submarine boats is, whenever possible, in order to maximize the cruising radius, to employ a power unit other than the storage battery generally present. Thus, when a submarine boat is running on the surface, it is desirable to use a heat engine. The secondary or storage battery equipment of the boat is used as its motive power at times when it is not practical to run the engines, as when the boat is submerged and under way, and a recharging thereof is periodically necessary.

The present invention is especially adapted for employment aboard a submarine boat, because of the fact that, in connection at least with the charging of such types of storage batteries as are in common use in submarine boats, during the latter part and toward the termination of the charging operation, gases are generated to a specially dangerous extent in view of the fact that a portion of the charging current produces a decomposition of the water of the electrolyte into oxygen and hydrogen. There results a physical mixture which consists of two parts of hydrogen to one of oxygen. This mixture unless greatly diluted is a highly and imminently dangerous explosive. Gases are also to some extent given off during the discharge of the battery and when it is idle. Therefore, the employment of the present process, in connection with the power equipment of a comparatively delicate and greatly complicated vessel like a submarine, furnishes an efficient and dependable safety-means to reduce anxiety and peril at all times. More than this, any embodiment of the invention will naturally be of great compactness, simplicity, and coöperativeness throughout, and will avoid rapid evaporation of the electrolyte while permitting the battery to be charged very rapidly without overheating.

The said features of compactness, simplicity and coöperativeness are due to the fact that one preferably continuous and pressure-driven flow of atmospheric air simultaneously cools the battery units, causes a ventilation of the interior of each of said units, and properly dilutes the explosive mixture freed partly by such ventilation. The aforementioned reduced evaporation is primarily due to the fact that, unlike a practice which has heretofore been employed, the air neither flows over the surface of the electrolyte nor traverses any portion of any cell interior. We have found by actual installation and test that when a battery is treated in accordance with our invention the evaporation of the water is reduced to about one-quarter. The high rate of charge permitted by our invention, which by actual test we have found to be twice the rate heretofore safely possible, is due mainly to the high cooling efficiency attained: which, furthermore, decreases evaporation and therefore helps ventilation. While the air flow which we employ is thus cooling the cells, thereby among other things working as above, such flow is itself causing a ventilation of the interior of each cell unit, and such ventilation helps the cooling. Moreover, decreased evaporation means less free moisture. The less such moisture, the less chance of sparking. While thus making remote the possibility of a spark to set off the explosive mixture, the same flow of air, in addition to its cooling and ventilating work, is itself aiding in the dilution of the explosive mixture so as to prevent even such a spark from becoming effective relatively of the mixture.

Various other objects and advantages of the invention will appear or be specifically referred to hereinafter, as a description of the process and the disclosed means for carrying it out proceeds.

The adaptability and value of the invention being as aforesaid so marked in connection especially with a submarine boat, the accompanying drawings in part disclose a type of apparatus, employable in carrying out the process, as being associated with portions of certain structural elements of a submarine boat. In these drawings,—

Figure 1 is a side elevation of such apparatus, certain parts of the apparatus and of said structural elements being shown in section;

Fig. 2 is a horizontal sectional view, taken on the line 2—2 of Fig. 1 and showing the battery cells and their covers in top plan;

Fig. 3 is a perspective view of an upper portion of one of said battery cells, isolated from its fellows;

Fig. 4 is an enlarged detail view, partially in section, of a battery-closure plug and its connections to the ventilation ducts;

Fig. 5 is a vertical sectional view, taken on the line 5—5 of Fig. 3 after said cell's cover has been equipped with the device of Fig. 4 and positioned on said cell in operative relation to one of the three longitudinally and parallelly arranged exhaust ducts shown in plan in Fig. 2;

Fig. 6 is a vertical sectional view taken on the line 6—6 of Fig. 5; and

Fig. 7 is a schematic view or diagrammatic illustration of the basic features of the process itself.

In first describing the system or apparatus here selected as one by the use of which the present novel process may advantageously be carried out, reference will preliminarily be made to Figs. 1 and 2. The numeral 8 indicates a supporting deck within the submarine. This deck 8, together with the walls or partitions 9 and 10, establishes a battery compartment the greatest dimension of which runs fore and aft of the submarine. This lay of the compartment is desirable, for the reason that fore and aft room is that which is always the most available in such craft. This fact is given due recognition in the present embodiment by locating the ventilating sub-compartments 14ª at the ends rather than at the sides of the main compartment.

Each of the cells 12 is preferably provided with a plurality of vertically arranged outer grooves 12ª shown most clearly in Fig. 3. The thickness of the cell wall at these grooves and its thickness at the ribs between the grooves are so related to the size of the cover 13, as disclosed in Figs. 5 and 6, that when a cover is placed on the cell and there supported in any suitable manner, the edge portions of the cover will overlie the cell walls but will not close the grooves 12ª. Each cell 12 is here supported upon a plurality of feet or stools 12ᵇ. A shelf 14 is mounted and arranged at each end of the cell compartment, as shown in Figs. 1 and 2, to establish the sub-compartments 14ª. Each of the shelves 14 is pierced by a depending pipe or conduit 15. The lower end of each pipe 15 opens into the upper interior of the sub-compartment 14ª which it enters and the upper end of each pipe 15 communicates with a force blower 16.

With the cells 12 generally rectangular in cross-section, and duplicates with reference to exterior conformation, and arranged as shown in Fig. 2, each cell is flanked on all sides by vertically arranged slots. All these slots are open top and bottom, and thus form, with the space beneath the cells 12, avenues of communication between the sub-compartments 14ª and the upper portion of the battery compartment. The net result of this arrangement is obviously that with an adequate flow of cooling air through said grooves and slots, so fed for the purpose through pipes 15 and into sub-compartments 14ª, each individual cell will be effectively cooled on all sides.

A main upstanding duct 17 is connected at its upper end to an exhaust blower 18 (see Fig. 1), and terminates at its lower end, as best shown in Fig. 2, in a connection with three parallel branch ducts 19. Each of the branch ducts is closed at its free end, and each of them along one of its sides is provided with a series of properly spaced pipes 19′, each communicating with the interior of a battery-cell through connection 21 and plug 20 having the upstanding nozzle 20′. Plug 20 is of a familiar construction and has a tube 20ª depending centrally into an interior plug-chamber containing a cylindrical baffle partition 20ᵇ and a series of baffle plates 20ᶜ in the path of the gases flowing from the inlets 20ᶠ through the plug to the ventilation conduits. For the purpose of adapting this plug to the principles of our invention by admitting the cooling air to the ventilation conduits without passing it over the electrolyte, and thereby effecting the ventilation by aspiration while rendering the gases non-explosive by dilution, we form the inlet apertures 20ᵍ in the nozzle 20′ as shown. The sum of the cross-sectional areas of apertures 20ᵍ should be at least of such gas-passage capacity, relatively of the gas-passage capacity of the interior diameter of said tube 20ª, that upon an actuation of the blower 18, the amount of air drawn into connection 21 will dilute the oxygen-hydrogen mixture so as to make it non-explosive. We have found that seven or eight times enough air thus to dilute said mixture is required to obtain the desired cooling effect; therefore an adequate supply of diluting air is always assured.

Each of the cells 12, in accordance with practice, is of course constructed, and preferably molded, of some insulating material, such as hard rubber; and the covers 13, the connections 21, and the ducts 17 and 19 are also preferably constructed of insulating material.

The blowers 16 and 18 are preferably operated simultaneously and both at high speeds during the charging operation. Since the present system is shown applied to a submarine boat, and since the charging operation is presumably being conducted during the boat's stay on the surface, there will be no difficulty in obtaining an air supply for force blowers 16 or in arranging for a dispersal exteriorly of the boat of the gases drawn off by exhaust blower 18. When the vessel is submerged, however, preferably merely one of the blowers is operated at high speed or two or all at low speeds, for then, the battery is not being charged and the gases generated are reduced greatly in amount. It is preferable during submergence to continuously operate at least one of the blowers, as we have found that the gases drawn off and diluted may be exhausted interiorly of the boat without evil effects. The air from the force blowers 16 enters subcompartments 14$^a$ (Figs. 1 and 2), passes beneath cells 12 (Fig. 2), and ascends through grooves 12$^a$. The cells are thereby thoroughly and continuously cooled, for one thing; but, for another, of equal if not greater importance, there is being fed to the upper portion of compartment 14, which may now be given the reference number 14$^b$ (Fig. 1), a continuous fund of air, for diluting and drawing off by its passage into and through nozzles 20' the dangerous cell gases. Each operating blower is working to draw off the generated gases through each plug 20, as rapidly as these gases are formed, and the effect of the arrangement described is to destroy the dangerous mixture of such gases, by drawing into a branch duct 19, at the very point whereat said mixture is entering such a branch duct, and at each of said points in degrees properly varying according as the amount of explosive mixture drawn off at a particular point of nozzle connection varies, suitably great quantities of air to render innocuous the drawn-off gases. It will be seen that by the means disclosed a pressure-driven current of air performs all the operations just mentioned, without causing evaporation of the electrolyte and without entering the interior of any cell-unit. It will be seen, too, that no explodable mixture can form in the ducts or elsewhere exteriorly of the cell-units, the potential difference of each of the cell-units being usually but two and one-half volts.

The process itself, then, may be described broadly as consisting of the following steps, or any sub-division or combination thereof, in the order given or any other order, or simultaneously, when coming within the scope of the invention as indicated by the appended claims.

First, cooling a cell or a plurality of cells of a storage battery by passing atmospheric air over the exterior surfaces of said cell or cells; then admixing such atmospheric air with the explosive or other gases generated during or as the result of a charging operation performed upon said cell or cells in a proportion suitably predetermined so that the final mixture will be non-explosive; the mixture of the said generated gases with said atmospheric air being preferably an independent mixture for each cell and occurring adjacent and simultaneously with the drawing-off of the generated gases from said cell and occurring as the result of directing the generated gases toward a stream of said atmospheric air at a distance from the interior of said cell; said atmospheric air being preferably pressure-driven. Thus, in Fig. 7, there is merely disclosed a pair of cells A each located in a compartment B; into the lower portions of these compartments, say from a distant source beyond the arrow C, atmospheric air is flowing as indicated by arrows D, first passing over and without coming into evaporating contact with the interior of either of the cells A, ventilating such cells and becoming admixed with the generated gases flowing as indicated by the arrows E, so as to create, adjacent each arrow E, a harmless mixture which passes on, as indicated by the arrow G, for dispersal elsewhere.

In closing this specification, it is deemed important to incorporate a specific statement, in view of the importance of the invention and because of a desire to avoid undue multiplicity of claims, of a present recognition of the force and benefit of the doctrine of equivalents as to the process, as to structural details, and especially as to the gas-mixing means defined herein.

We claim:—

1. The improved process of treating storage batteries which consists in establishing and sustaining a current of cooling air about the cells of the battery and out of contact with the electrolyte therein, subdividing the current of cooling air into separate streams one for each cell, withdrawing the cell gases from each cell and mixing each stream with the withdrawn cell gases from one of the cells to dilute the cell gases from each cell separately.

2. The improved process of treating storage batteries which consists in subdividing a current of air into separate streams which pass over the exteriors of the cells to cool the same, then permitting the streams to blend and mix, guiding the generated cell gases from each cell so that such cell gases are isolated from the other cell gases, and permitting a portion of the blended and mixed streams to dilute merely a collection of cell gases from one of the cells; meanwhile maintaining the cooling and diluting air out of contact with the electrolyte in the cells.

3. The improved process of treating storage batteries which consists in establishing and sustaining a current of cooling air about the cells of the battery and out of contact with the electrolyte therein, subdividing the current of cooling air into separate streams one for each cell, withdrawing the cell gases from each cell, causing each stream to mix only with the withdrawn cell gases from one of the cells, and guiding said streams into one main stream while applying pressure to the main stream to convey it to a suitable point of discharge considerably removed from the cells.

4. In a storage battery system of the class described, in combination with a compartment and a storage battery cell therein, a duct communicating directly with the interior of said cell and leading to a point exterior to said compartment for drawing off the gases generated within the cell and provided with an opening above the top of the cell through which gases from another source may be simultaneously drawn into the duct; said duct and said opening being so proportioned and designed that the explosive gases drawn into said duct will by the admixture therewith of said gases drawn from another source be so changed as to be made non-explosive.

5. In a storage battery system of the class described, in combination with a compartment and a plurality of storage battery cells of the individually closed type in said compartment, ducts for drawing off the gases generated within the cells and discharging said gases at a point exterior to the compartment, each duct being provided with an opening above the top of its cell, and means for causing gases from another source to pass through the openings for subsequent passage through the ducts away from the interior of the cells and for simultaneously causing the gases generated within the cells to enter the ducts for subsequent passage therethrough away from the interiors of the cells.

6. In a storage battery system of the class described, in combination with a battery compartment and a storage battery cell therein, a duct leading from said cell for drawing off the gases generated within the cell and for discharging the gases at a point exterior to the compartment, the duct being provided with an opening intermediate its ends through which gases from another source may be drawn into the duct, the duct and opening being so proportioned and designed that all the gases in the duct beyond the cell and the opening in the duct will be so admixed as to be made non-explosive, conducting means for said gases from another source so arranged and disposed that these gases are preliminarily caused to flow over the outsides of the cells to cool the same, and pressure establishing means for drawing said gases into the ducts and mixing them therein as described.

7. In a storage battery system of the class described, in combination, a cell-compartment, a cell therein, an inlet passage leading into the lower part of said compartment, an outlet passage leading from the lower to the upper part of said compartment whereby gases flowing therethrough may cool said cell, a passage leading from the gas-zone interior of said cell and leading through the upper part of said compartment to the exterior thereof, and a transverse aperture in the last-mentioned passage, whereby the gases flowing from the outlet passage will enter the aperture, avoid entering into the cell, and mix with the gases in the passage leading from the gas zone interior of the cell while passing through the last mentioned passage toward the end thereof exterior to the compartment.

8. In a storage battery system of the class described, in combination, a bank of cells, covers on the cells, upstanding nozzles carried by the covers, a duct overlying said bank of cells, said duct being closed at one end and having an exhaust blower connected to the other end, and branch passages connecting said nozzles and said ducts, each of said nozzles placing in communication the interior of its cell and the interior of its branch passage and each of said nozzles being provided with an opening above the top of its cell, in the case of each nozzle the gas-passage capacity of said opening being greater than the gas-passage capacity of said nozzle.

9. In a storage battery system of the class described, in combination, a bank of cells, covers on the cells, upstanding nozzles carried by the covers, a duct overlying said bank of cells, said duct being closed at one end and having an exhaust blower connected to the other end, and branch passages connecting said nozzles and said ducts, each of said nozzles placing in communication the interior of its cell and the interior of its branch passage and each of said nozzles being provided with an opening above the top of its cell, in the case of each nozzle the gas-passage capacity of said opening being greater than the gas-passage capacity of said nozzle, means being provided for supplying cooling air about said bank but at a point removed from said openings.

10. The improved process of treating storage batteries which consists in establishing a current of air which is subdivided into a plurality of streams, one for each cell of the battery, and mixing each stream of air with the gases from the corresponding cell while keeping the stream of air out of contact with the electrolyte in the cell so that the gases are diluted by being mixed with air and are carried off from the battery by the air.

In testimony whereof we affix our signatures.

CHARLES H. BEDELL.
GRANT E. EDGAR.

Copies of this patent may be obtained for five cents each, by addressing the "Commissioner of Patents, Washington, D. C."